United States Patent [19]
Kasama et al.

[11] Patent Number: 4,571,053
[45] Date of Patent: Feb. 18, 1986

[54] IMAGE FORMING APPARATUS

[75] Inventors: Nobuhiro Kasama, Yokohama; Mitsuru Kurata, Kawasaki; Hiroshi Tanioka, Tokyo; Tadashi Yamakawa, Yokohama; Yutaka Inoue, Urawa; Masao Hosaka, Sagamihara; Toshiaki Yagasaki, Hino, all of Japan

[73] Assignee: Canon Kabushiki Kaisha, Tokyo, Japan

[21] Appl. No.: 651,779

[22] Filed: Sep. 18, 1984

[30] Foreign Application Priority Data

Sep. 22, 1983 [JP] Japan .................... 58-174374
Sep. 22, 1983 [JP] Japan .................... 58-174375

[51] Int. Cl.⁴ ............................................. G03G 15/00
[52] U.S. Cl. ........................................ 355/3 R; 355/1; 355/14 R; 350/342; 340/767; 340/784
[58] Field of Search ................ 355/3 R, 1, 14 R; 350/331 R, 342; 340/723, 766, 767, 784

[56] References Cited
U.S. PATENT DOCUMENTS 3,788,739  1/1974  Coriale ................. 355/3 R X
4,162,396  7/1979  Howard et al. ......... 355/14 R X
4,297,022  10/1981 Lester ................... 355/1 X
4,348,100  9/1982  Snelling ................ 355/14 R Primary Examiner—A. C. Prescott
Attorney, Agent, or Firm—Fitzpatrick, Cella, Harper & Scinto

[57] ABSTRACT

An image forming apparatus comprises a light source, a photosensitive member adopted to be illuminated by a light from the light source, a liquid crystal for controlling illumination and non-illumination of the light to the photosensitive member to form an image on the photosensitive member, a detector for detecting an image reproduction ability of the photosensitive member to set an image forming condition on the photosensitive member, and setting means for setting the liquid crystal to a predetermined state to allow the detection by the detector.

19 Claims, 18 Drawing Figures

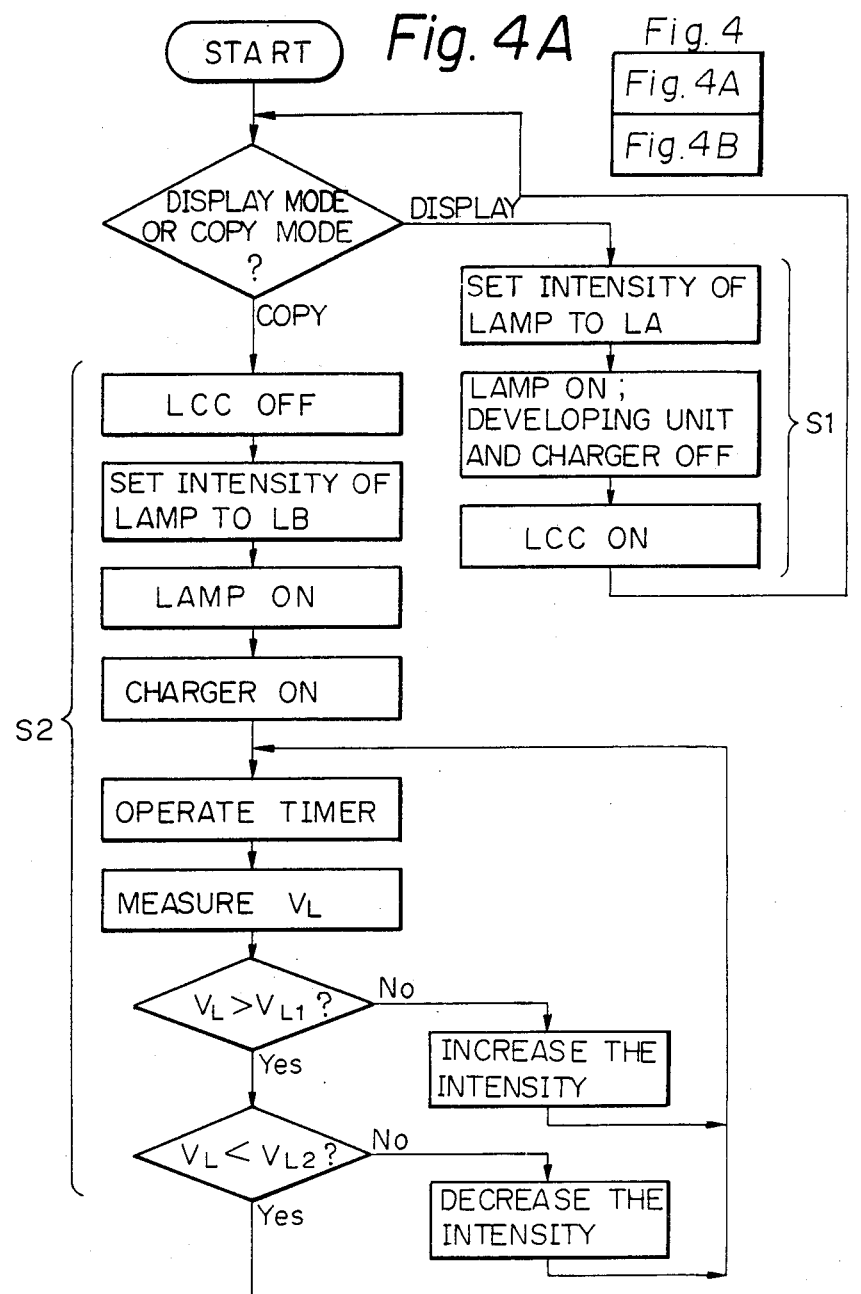

IMAGE FORMING APPARATUS

BACKGROUND OF THE INVENTION

1. Field of the Invention

The present invention relates to an image forming apparatus for forming characters or a graphic image on a record medium, and more particularly to an image forming apparatus for forming the image by a light.

2. Description of the Prior Art

In a prior art image forming apparatus such as a conventional copying machine, an original sheet mounted on an original sheet table made of a transparent material is illuminated from the bottom of the original sheet table and a reflected light representing densities of the original sheet is condensed by an optical system including a lens to focus an image of the original sheet on a photosensitive drum.

On the other hand, a liquid crystal display device is used as an image output device for a computer. By mounting the liquid crystal display device on the original sheet table with the display screen of the display device being faced to the plane of the original sheet table, generating the image on the display screen and effecting the copy operation of the copying machine, a hard copy of the display image of the liquid crystal display is formed.

FIG. 1 shows a copying machine capable of forming such a hard copy. It shows a perspective view of an image processing apparatus comprising a combination of a liquid crystal display device and a copying machine with a liquid crystal display screen being attached to a cover of the copying machine.

Numeral 1 denotes an electrostatic photographic plain paper copying machine, and numeral 2 denotes a cover-shaped display device with a display screen 3 being constructed to cover an original sheet table 4. The display device 2 is connected to a personal computer 5 with a keyboard through a cable 6.

Thus, the display screen is used for a console output of the computer 5, processed information is displayed on the display screen 3 and the cover-shaped display device 2 is folded down after the display content has been checked by an operator, and a copy operation is started so that a hard copy of the display content is readily formed. When the computer 5 is used as a word processor, a text displayed on the display screen 3 is corrected and checked and then a hard copy can be formed. Accordingly, operability and copy efficiency are improved. In a system which uses a local area network (LAN) to connect a plurality of computers to transfer information, image information can be transferred between offices, the image information is displayed on the display screen 3, the display content is checked and only the necessary information may be recorded as a hard copy. When the display screen 3 is kept wholly blank, the copying machine 1 can be used to copy a conventional document. Accordingly, it serves as multi-purpose office equipment.

The liquid crystal display device used as the display screen includes two types, a reflection type and a transmission type. The reflection type has a reflection plate arranged on a back side of the liquid crystal display device and the transmission type has a light source arranged on the back side. Neither type provides high contrast images.

Even if the displayed image has a high contrast when it is visually observed, the contrast is insufficient to make a copy of the image on the liquid crystal display and the image of the copy is very hard to distinguish. This is caused by a low sensitivity of the photoconductor.

When the image is displayed with an optimum intensity to the copy operation (which is fairly higher than the optimum intensity for the normal display), it is too glaring for a human eye because the background is too bright, and outlines of characters or images are not sharp because light diffracts into edges of the characters or images.

SUMMARY OF THE INVENTION

It is an object of the present invention to provide an image forming apparatus capable of forming a high contrast image by compensating for a contrast of a liquid crystal display.

It is another object of the present invention to provide an image forming apparatus which uses a liquid crystal display device and a light emitting device and which can form a high contrast image by controlling an intensity of the light emitting device.

It is another object of the present invention to provide an image forming apparatus which forms a latent image on a photoconductor by a liquid crystal display device and a light emitting device and which can form a high contrast image by controlling the charging voltage of a charger which uninformly charges the photoconductor.

It is another object of the present invention to provide a display/copying machine capable of forming a high contrast hard copy from an image displayed on a liquid crystal display device.

It is another object of the present invention to provide a display/copying machine in which an intensity of a light emitting device is changed between a display mode and a copy mode.

The other objects of the present invention will be apparent from the following description of the invention.

DETAILED DESCRIPTION OF THE PREFERRED EMBODIMENTS

Figure 1:
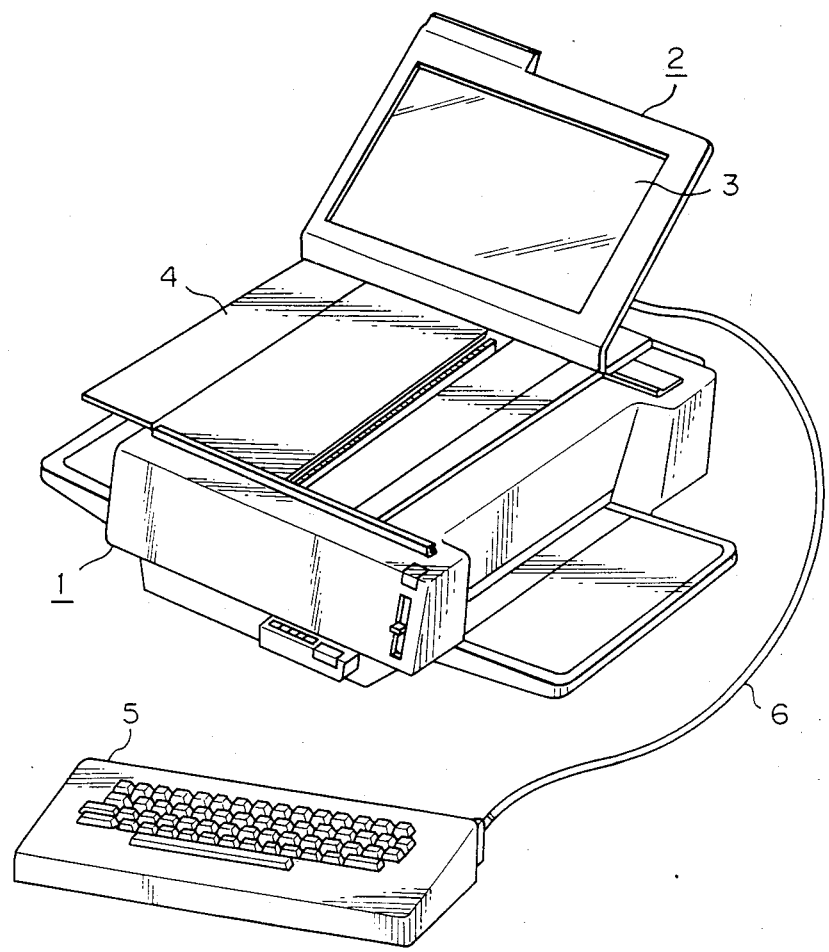
FIG. 1 is a perspective view of a prior art image apparatus.
Figure 2:
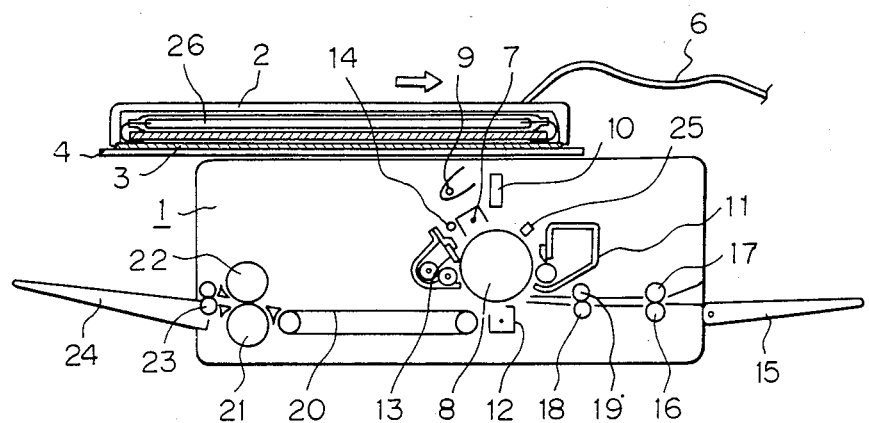
FIG. 2 is a sectional view of an image processing apparatus using transmission type liquid crystal.

A first embodiment of the present invention is now explained in detail with reference to the drawings. FIG. 2 shows a sectional view of an image copying machine, in which the like elements to those shown in FIG. 1 are designated by the like numerals and the explanation thereof is omitted.

Numeral 7 denotes a primary charger, numeral 8 denotes a photosensitive drum, and numeral 9 denotes an original sheet illuminating exposure lamp used to copy a normal original sheet. It is turned off when a liquid crystal display screen is printed out. Numeral 10 denotes a lens array comprising a number of self-focusing fibers, numeral 11 denotes a developing unit for visualizing a latent image on the photosensitive drum 8, numeral 12 denotes a transfer charger, numeral 13 denotes a cleaner, numeral 14 denotes a pre-exposure lamp, numeral 15 denotes a manual insertion tray on which copy papers are loaded, numerals 16 and 17 denote paper feed rollers, numerals 18 and 19 denote registration rollers, numeral 20 denotes a conveyor belt, numerals 21 and 22 denote fixing rollers, numeral 23 denotes a paper eject roller, numeral 24 denotes a paper eject tray, numeral 25 denotes a surface potential sensor for detecting a surface potential of the photosensitive drum 8, and numeral 26 denotes a flat fluorescent lamp as a planar light emitting source arranged on a back side of the transmission type liquid crystal display 3. A light intensity of the fluorescent lamp 26 is variable by a high frequency lighting device.

The operation of copying a normal original sheet is first explained.

The photosensitive drum 8 is charged by the primary charger 7, and the exposure lamp 9 is turned on to illuminate the original sheet on the platen 4. The platen 4 is moved in a direction of an arrow as the photosensitive drum 8 is rotated. The light reflected by the original sheet is directed to the photosensitive drum 8 through the lens array 10. Charges on the areas of the drum 8 illuminated by the light are removed and charges on the non-illuminated areas remain so that an electrostatic latent image is formed on the photosensitive drum 8. The latent image is then visualized by toner by the developing unit 11. On the other hand, copy papers are loaded in the manual insertion tray 15 and fed to the registration rollers 18 and 19 by the paper feed rollers 16 and 17. The registration rollers 18 and 19 are rotated in timed relation with the toner image on the photosensitive drum 8, and the transfer charger 12 charges the copy paper on the back side thereof so that the toner image is transferred to the copy paper. The copy paper is then fed to the fixing rollers 21 and 22 through the conveyor belt 20 and the toner image is fixed. The copy paper is ejected to the paper eject tray 24 through the paper eject roller 23. The toner left on the photosensitive drum 8 is removed by the cleaner 13, and the residual charges are removed by the pre-exposure lamp 14.

The operation in copying the original sheet has thus been explained. When a liquid crystal display image is to be copied, the exposure lamp 9 is turned off and the flat fluorescent lamp 26 is turned on. The latent image formation, developing, transferring, fixing and cleaning operations remain unchanged.

Prior to the above copy operation, the apparatus of the present embodiment controls a surface potential of the photosensitive drum 8. The control of the surface potential is explained with reference to a circuit diagram of FIG. 3 and a control flow chart of FIG. 4.

Figure 3:
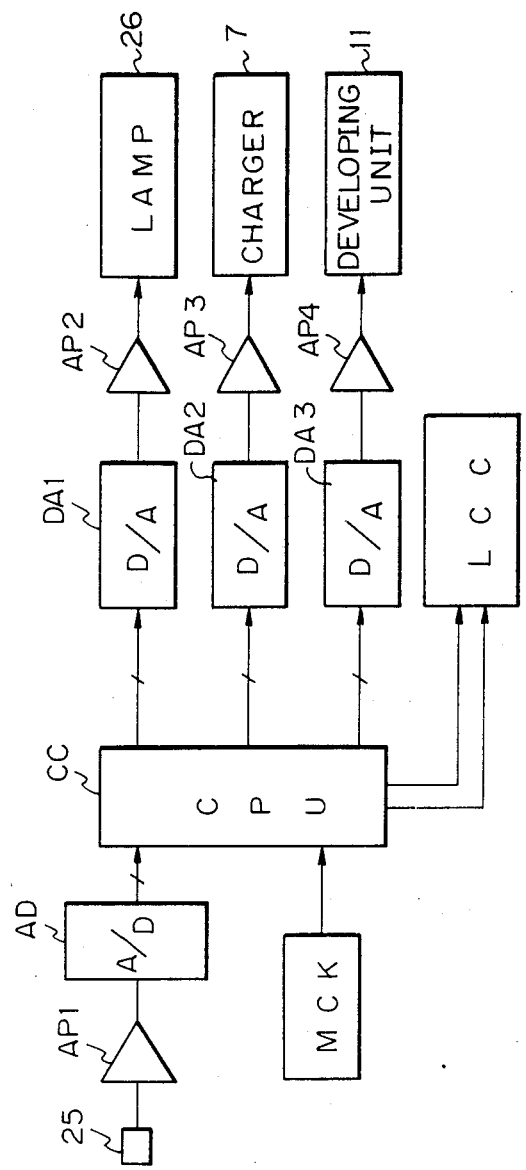
FIG. 3 shows a surface potential control circuit, FIG. 4 composed of FIG. 4A and 4B shows a control flow chart.
Figure 4B:
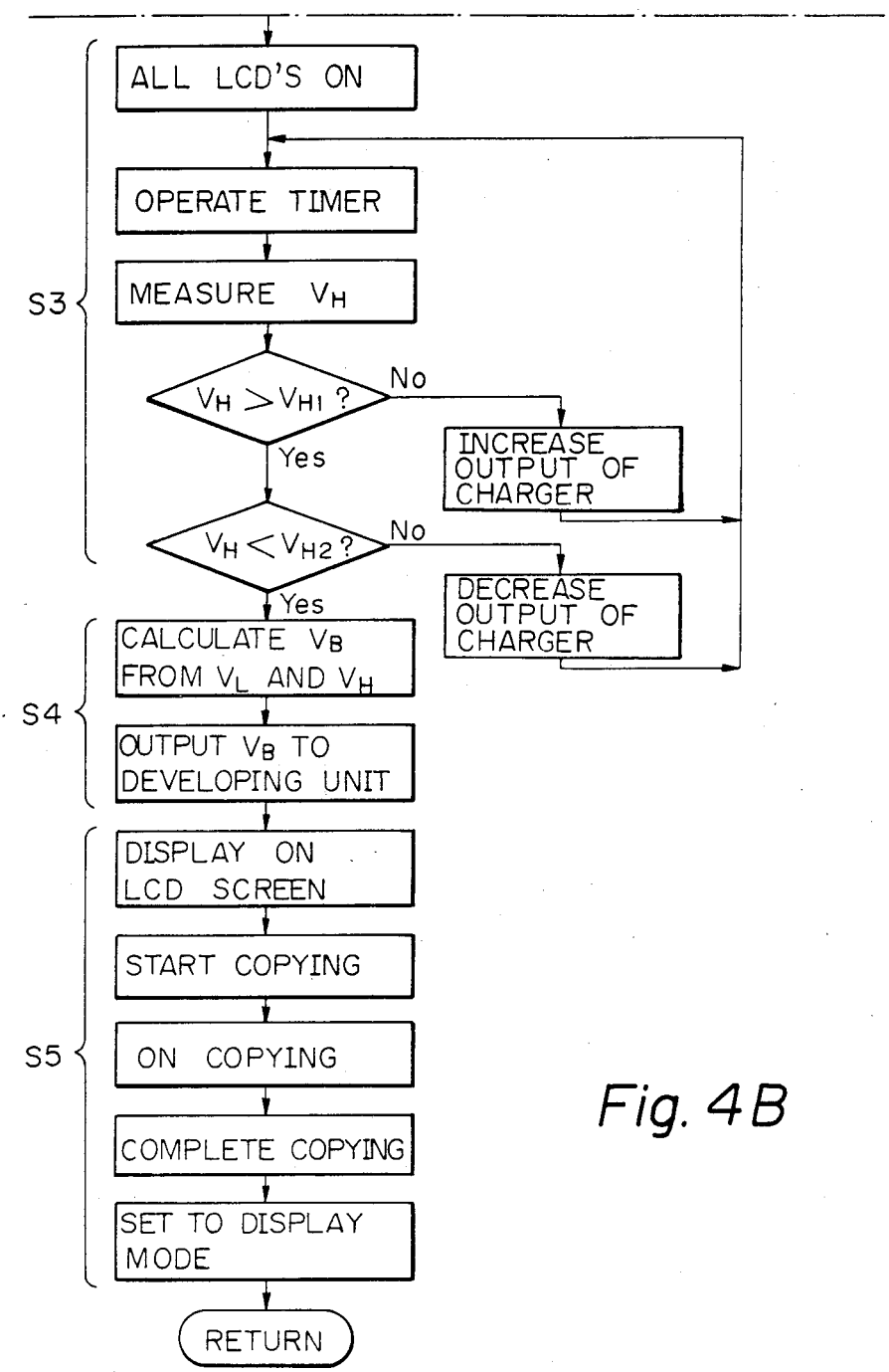

In FIG. 3, AP1 denotes an amplifier for amplifying an output of the potential sensor 25, AD denotes an analog to digital converter, CC denotes a central controller which includes a ROM for storing a control program of FIG. 4, a RAM and an ALU, DA1-DA3 denote digital to analog converters, AP2-AP4 denote amplifiers, MCK denotes a mode selection key for selecting a display mode or a copy mode, and LCC denotes a display circuit of the liquid crystal display device 3.

Referring to the control flow chart of FIG. 4, when the display mode has been selected, the intensity of the lamp 26 is set to LA which is lower than the intensity in the copy mode, the lamp 26 is turned on and the liquid crystal display circuit LCC is activated to display the image on the liquid crystal display device 3 (S1).

If the copy mode is selected by the mode selection key MCK after the display operation, the liquid crystal display circuit LCC is deactivated so that the liquid crystal is set to the transmission mode. The intensity of the lamp 26 is set to an intensity which is higher than that in the display mode and the lamp 26 is turned on. Then, the charger is activated to uniformly charge the rotating photosensitive drum 8. As the illuminated areas on the photosensitive drum 8 reach a position facing the potential sensor 25, the potential sensor 25 measures a light area potential $V_L$. The intensity of the lamp 6 is adjusted such that the light area potential $V_L$ falls within a range indicated by $V_{L1} < V_L < V_{L2}$ (S2).

Then, the liquid crystal of the liquid crystal display circuit LCC is turned on to block the transmitted light of the lamp 26. As the photosensitive drum 8 is rotated and the non-illuminated areas of the photosensitive drum 8 reach the position facing the potential sensor 25, the potential sensor 25 measures a dark area potential $V_H$. The output voltage or current of the charger 7 is controlled until the dark area potential $V_H$ meets a condition $V_{H1} < V_H < V_{H2}$ (S3).

Through the above steps, the dark area potential $V_H$ and the light area potential $V_L$ are controlled to the predetermined potentials and the contrast is kept constant. In a step S4, a developing bias potential $V_B$ of the developer 11 is determined from the converged $V_L$ and $V_H$ and it is supplied to the developer 11. When the $V_L$ and $V_H$ are measured, no voltage is applied to the developer 11 and no developing operation is carried out.

In a step S5, the stored image is displayed on the liquid crystal display device 3 by the liquid crystal display circuit LCC. The copy operation is carried out at the controlled intensity, charger output and developing bias potential. Accordingly, a shade-free and high contrast hard copy is formed.

After the copy operation has been completed, the apparatus returns to the display mode. The platen 4 may be stopped or moved during the steps S2 and S3.

When the apparatus is to be used as a normal copying machine after the above copying operation, the light intensity or the applied voltage to the primary charger 7 is reduced to reduce the light intensity to provide for an optimum visual observation. The dark or light area potential may be controlled while the platen 4 is stopped (beyond the image area) by utilizing a leading or trailing edge of the image.

Figure 5:
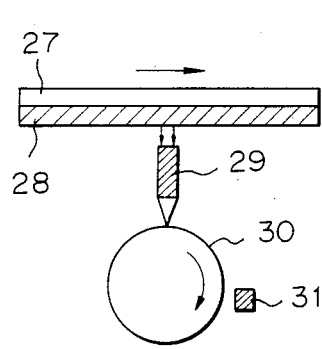
FIG. 5 is a conceptual view of a display/copy system.

FIG. 5 shows a basic conceptual view of a graphic display/image scanner. A planar light emitting source 27 and a transmission type liquid crystal (LCD) 28 are paired, the LCD 28 is switched to block or transmit the light from the planar light emitting source 27 and the light is focused by a lens array 29 to form a latent image on the photoconductor drum 30. The LCD is switched to a closed state and the $V_H$ (dark area) is measured with the surface potential being applied, and then the LCD is switched to an open state and the $V_L$ (light area) is measured without application of the surface potential. When an image on the display screen is to be copied, the bias potential is changed to provide a proper contrast, the LCD is similarly switched and the surface potential is monitored. The surface potential is monitored by a potential sensor 31.

Figure 6:
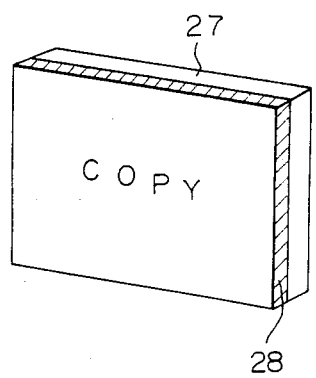
FIG. 6 is a perspective view of a display having a light source and a transmission type liquid crystal.

FIG. 6 shows a combination of the planar light emitting source 27 and the LCD 28, which is used as the display. The planar light emitting source 27 may be a fluorescent display panel or an electroluminescent (EL) panel which has recently made a significant advancement as a light source. In the present embodiment, the EL panel is used. The EL panel is characterized by an electro-optical light source without heat generation. The light emitted is red, blue or green. In the present embodiment, the green EL panel which exhibits an excellent spectroscopic sensitivity matching the photosensitive member is used. With this light wavelength, eye fatigue is minimal from a human engineering standpoint and the spectroscopic sensitivity is high. When the display/copier of the present invention is used as a copier for copying a normal original sheet, not only a line text but also a photographic text containing gray level images can be reproduced with a high reproducibility. Further, a conversion between a soft tone and a hard tone is attained. Since the light intensity of the EL panel is proportional to an applied voltage and a frequency, the voltage is stepped up by switching (to approximately 200 V) and the frequency of 500-1000 Hz is used in the present embodiment. Since the light intensity is changed in accordance with the detected light area potential $V_L$ of the surface potential sensor, the applied voltage and the frequency are variable.

Figure 7:
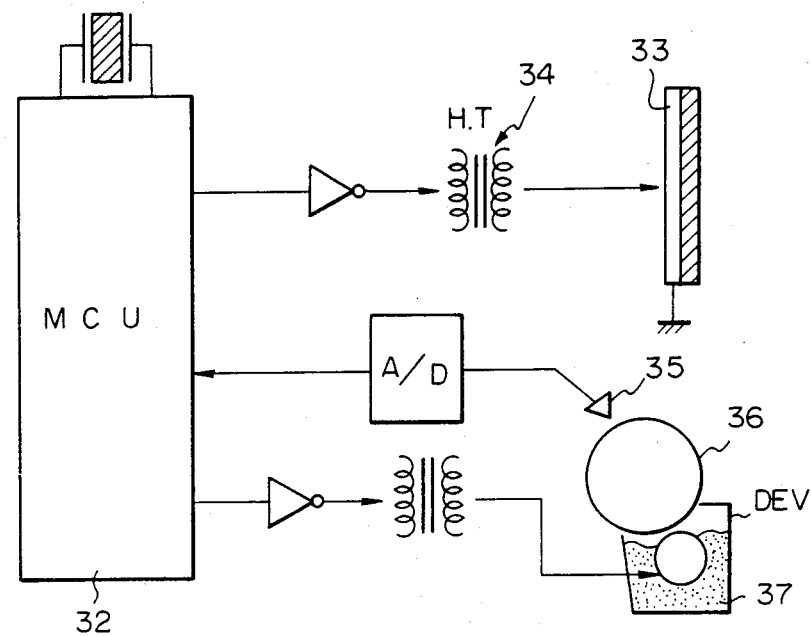
FIG. 7 is a circuit diagram of one embodiment of the present invention.

FIG. 7 shows a relation therebetween. A microcomputer (MCU) 32, the light intensity of the EL 33 and the voltage and the frequency of the bias to the developer are variable. The surface potentials $V_H$ and $V_L$ are monitored by the surface potential sensor.

The control of the EL 33 is first explained. The control is based on the pulse width modulation (PWM). The pulse width is modulated by the PWM and the voltage is stepped up by a high frequency transformer (H.T) 34. The voltage and the frequency on the secondary winding of the transformer 34 are determined by the PWM. The PWM is determined by a combination of an internal pulse of the MCU 32 and a program. A potential sensor 35 mechanically chops an electrostatic potential by a ceramic vibrator. A small and high linearity electrostatic chopper type potential sensor is recently available. The output thereof is A/D converted and a serial output therefrom is supplied to the MCU 32.

The bias potential of the developer DEV is controlled by the surface potentials $V_H$ and $V_L$. The control of the bias voltage and the frequency is similar to that of the power supply of the EL 33. Numeral 36 denotes a photosensitive drum, numeral 37 denotes a toner and DEV denotes the developer.

Figure 8:
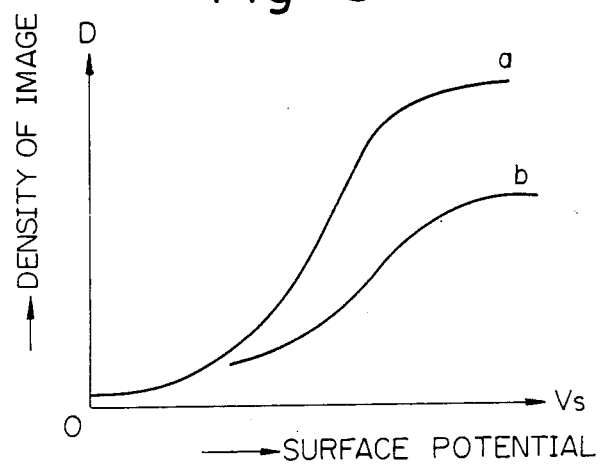
FIG. 8 shows a relation between a surface potential of a photosensitive drum and an image density.

The planar light emitting source or EL 33 and the method for generating the bias voltage have been briefly explained. FIG. 8 shows a tonality of the development. It is a V-D curve representing a relation between the surface potential of the photosensitive drum and the image density. A curve a produces a hard tone image and a curve b produces a soft tone image. Those curves are attained by adjusting the resistance of the photosensitive drum 36 during the formation of the image. The resistance of the photosensitive drum 36 may be adjusted by varying a temperature of the drum 36 by a heater.

The soft tone and the hard tone may be switched by varying the thickness of the toner 37 coated on the surface of the developing roller. In the display copy mode, the bias voltage is set to 600 V and the thickness of the coating is set to high to produce the hard tone image, and in the normal copy mode, the bias voltage is reduced to 450 V and the thickness of the toner coating is set to low to produce the soft tone image. In a jumping development method, the frequency of the A.C. bias voltage is switched to attain the hard tone development (800-1600 Hz) and the soft tone development (200-600 Hz).

In the present embodiment, the PWM is attained by the combination of the internal counter of the MCU 32 and the program to switch the bias voltage and the frequency.

Figure 9:
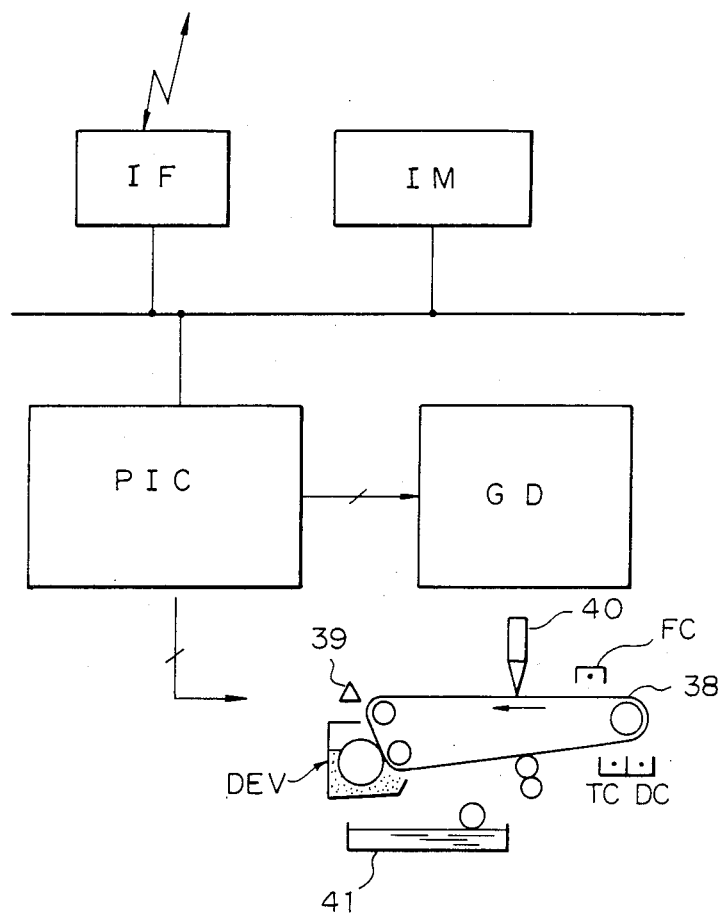
FIG. 9 shows a configuration of a network system.

FIG. 9 is a conceptual view of the configuration of the present invention. The apparatus is connected with another computer and image processor through a local area network (LAN). An interface IF to the LAN is shown in FIG. 9. An image memory IM temporarily stores a transmitted image. A printer controller/image scanner PIC is a controller of an image forming system by an electrostatic photography. A copy of a normal original sheet can also be formed. A graphic display GD is a combination of a transmission type liquid crystal and a planar light emitting source. An image thereon is scanned to form a hard copy. FIG. 9 shows a diagram of a photosensitive belt (web) 38. DEV denotes a developer, PC denotes a primary charger, TC denotes a transfer charger, DC denotes a separation charger, numeral 39 denotes a potential sensor, numeral 40 denotes a lens array and numeral 41 denotes a cassette.

In the above embodiments, the transmission type liquid crystals are used. An embodiment which uses a reflection type liquid crystal is now explained.

Figure 10:
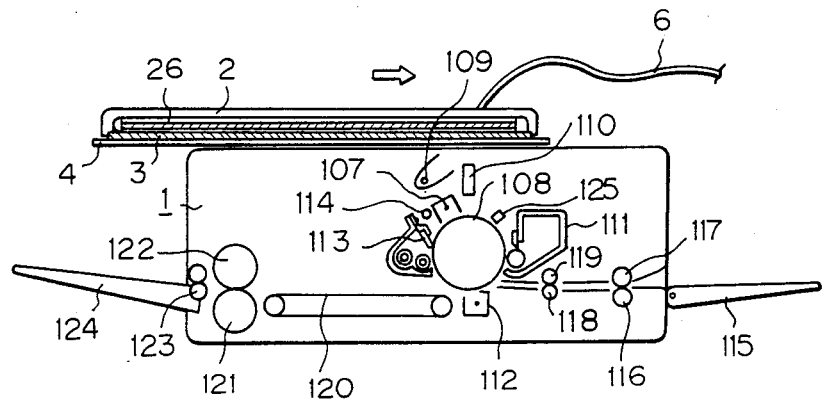
FIG. 10 is a sectional view of an image forming apparatus using a reflection type liquid crystal display, FIG. 11 a conceptual view of a display/copy system.

FIG. 10 shows a sectional view of such an embodiment of the image processing apparatus. The like elements to those shown in FIG. 1 are designated by the like numerals and the explanation thereof is omitted.

Charges are applied to a photoconductive drum 108 by a primary charger 107, and an image is exposed by an exposure lamp 109 and a lens array 110 to form a latent image on the photosensitive drum 108. The latent image is developed by a developer 111 and the image is copied by a transfer charger 112. Numeral 113 denotes a cleaner and numeral 114 denotes a pre-exposure lamp.

A copy paper is fed from a manual insertion tray 115 into a copying machine 1 by paper feed rollers 116 and 117. The copy paper is charged on its back side by the transfer charger 112 in a timed relation with the image by register rollers 118 and 119 so that the toner image is transferred to the copy paper. Then, the image is fixed through a conveyor belt 120 and fixing rollers 121 and 122 and the copy paper is ejected to a paper ejection tray 124 by an eject roller 123.

Numeral 125 denotes a potentiometer for measuring a potential on the photosensitive drum 108. It is connected to a circuit (not shown) for controlling the potential on the photosensitive drum 108 to a predetermined level. A reflection plate 126 is arranged on a back side of a display screen or a reflection type liquid crystal device 3 to increase a contrast of the liquid crystal.

When the image display operation terminates and the copy operation starts, the characters or the images displayed on the liquid crystal are extinguished and the light area potential on the photosensitive drum 108 corresponding to the background (light area) is measured by the potentiometer 125. The intensity of the exposure lamp 109 is raised until the light area potential reaches the predetermined potential (at which the background no longer shades the copy).

Then, the display of the liquid crystal is blackened and the output of the primary charger 107 above the photosensitive drum 108 is changed such that the dark area potential reaches a predetermined level. The above operation is repeated several times so that the contrast between the light area potential and the dark area potential converges to a predetermined level. During this step, the platen 4 may either stop or be moved.

At the end of the control, the stored image is displayed on the liquid crystal display screen 3 and copied. Thus, a shade-free high contrast copy is produced.

When the apparatus is to be used as a normal copier after the above copy operation, the light intensity and the applied voltage to the primary charger 107 are returned to the original levels. If the image is not stored, the light and/or dark area potential may be controlled while the platen 4 or the display device 3 is stopped, by utilizing a loading or trailing edge of the image.

Figure 11:
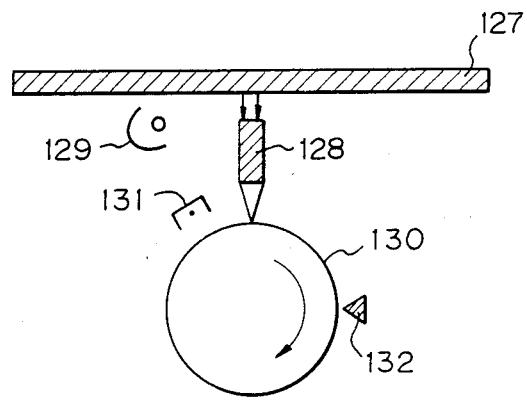

FIG. 11 shows a conceptual view of the display copy system of the present invention. An image is formed on a photosensitive drum 130 by a combination of a reflection type liquid crystal panel 127, a lens array 128 and a light source 129. In the present invention, the image displayed on the reflection type liquid crystal panel 127 is extinguished before the copy operation is started, the potential ($V_L$) on the photosensitive drum 130 corresponding to the background (light area) is measured, and the intensity of the light source 129 (halogen lamp or fluorescent lamp) is changed such that the potential $V_L$ reaches a predetermined level and the bias voltage and the frequency are also changed such that an optimum light area potential $V_L$ is reached.

Figure 12:
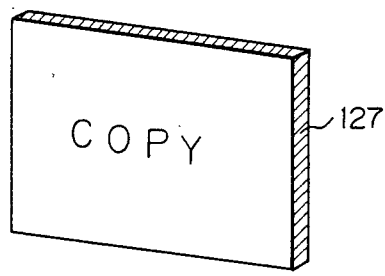
FIG. 12 is a perspective view of a reflection type liquid crystal panel.

Then, the display on the liquid crystal is blackened and the potential of the charger 131 (CC) is changed such that an optimum dark area potential ($V_H$) is reached. The above operation is repeated to determine the optimum charge, exposure and bias level. Numeral 132 denotes a potential sensor. Both white and black patterns may be displayed on the same screen to conduct the above control. FIG. 12 shows the reflection type liquid crystal panel 127 which also serves as an original sheet pressing plate for the normal copy operation.

Figure 13:
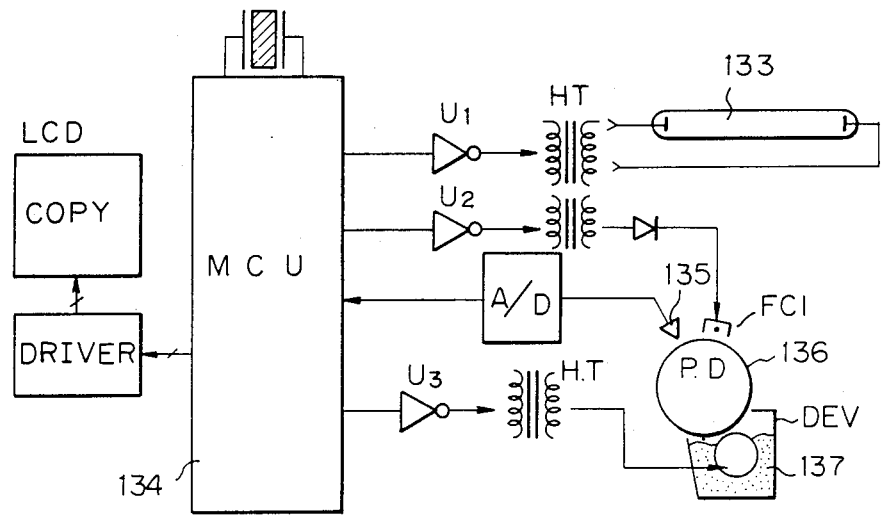
FIG. 13 shows a control circuit of the present embodiment.

FIG. 13 shows a conceptual view of a control system in the present invention.

Figure 16:
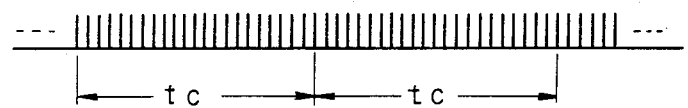
FIGS. 16 and 17 illustrate a pulse modulation system.
Figure 17:
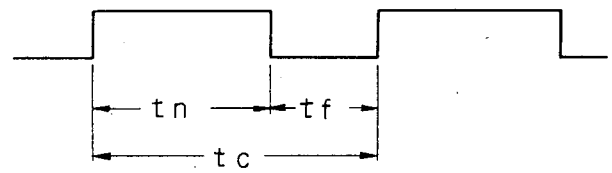

In order to select process conditions for the display copy made and the normal copy mode, a light source 133 (fluorescent lamp or halogen lamp), a high voltage source, a bias potential and a bias frequency are controlled by a one-chip microcomputer (MCU) 134. The control is basically effected by pulse width modulation (PWM). The number of pulses and the pulse width are controlled by a combination of an internal pulse of the MCU and a program. The basic generation system may control the number of pulses in a given period (chopping period $t_c$) as shown in FIG. 16 or control a duty ratio of an ON time ($t_n$) and an OFF time ($t_f$) as shown in FIG. 17. The former is primarily used for the control of the light source such as the fluorescent lamp and the latter is primarily used for the control of the high voltage supply or the bias supply. In FIG. 13, the fluorescent lamp is used as the light source. A high frequency oscillation system is used for the fluorescent lamp to assure the stability and the linearity. A 20 KHz fundamental oscillation is used as a 1 KHz chopping period. The high frequency output oscillated by the MCU and stabilized by the PWM control is produced in the secondary winding of the transformer H.T to light the fluorescent lamp. The light intensity can be linearly varied by controlling the number of pulses in the chopping period.

The primary charger PC1 increases or decreases the generated voltage by the PWM control as is done for the fluorescent lamp.

A potential sensor 135 mechanically chops an electrostatic potential by a ceramic vibrator. A compact and high linearity electrostatic chopper type potential sensor is recently available. The output thereof is A/D converted and the serial output thereof is supplied to the MCU.

Figure 14:
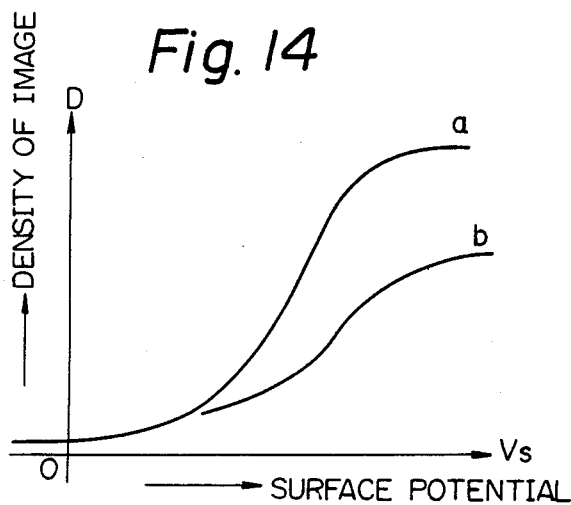
FIG. 14 shows a relation between a surface potential of a photosensitive drum and an image density.

The bias voltage is controlled by the surface potentials $V_H$ and $V_L$. FIG. 14 shows a tonality of development. It shows a $V_s$-D curve indicating a relation between the surface potential of the photosensitive drum 136 and the image density. A curve a produces a hard tone image and a curve b produces a soft tone image. It is controlled by adjusting a resistance of the photosensitive drum 136 during the image formation by the method described above. Another method for selecting the tonality is attained by changing the thickness of the toner 137 coated on the surface of the developing roller. In the display copy mode, the bias voltage is set to 600 V and the thickness of the coating is set larger so that the hard tone image is produced, and in the normal copy mode, the bias voltage is set to 450 V and the thickness of the coating is set smaller so that the soft tone image is produced. In a jumping developing method, the frequency of the A.C. bias voltage is switched to select the hard tone development (800–1600 Hz) and the soft tone development (200–600 Hz).

As described above in the present embodiment, the PWM is effected by the combination of the internal pulse of the MCU 134 and the program to switch the bias voltage and the frequency. DEV denotes a developer.

FIG. 14 shows a conceptual view of the present invention.

Figure 15:
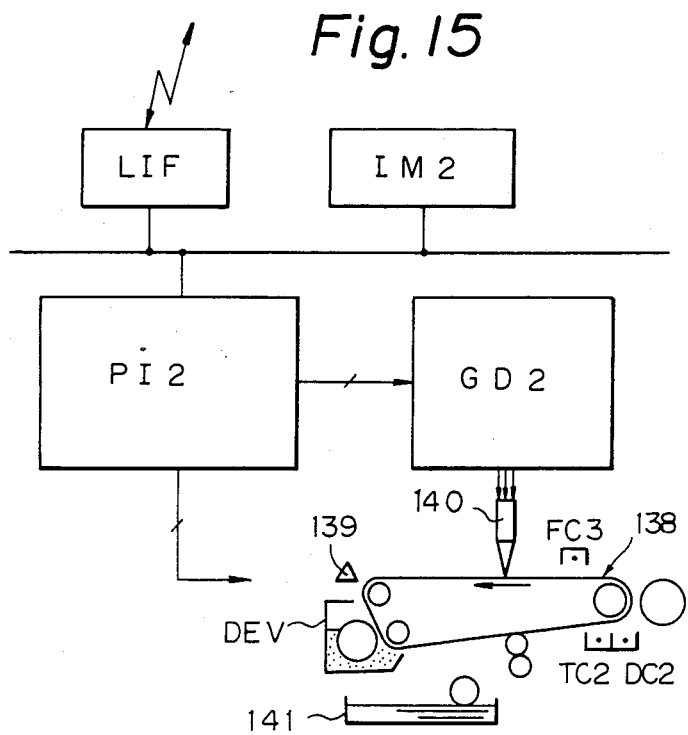
FIG. 15 shows a configuration of a network system.

The apparatus is connected with other computer and image processing equipment through a local area network (LAN). In FIG. 15, an interface LIF for the LAN is provided. An image memory IM2 temporarily stores the transmitted image. A printer controller/image scanner PI2 controls an image forming system by electrophotography. The apparatus can also function as a normal copier. A display GD2 is a reflection type liquid crystal in the present embodiment. In the normal copy mode, the tone is set to white so that the background light is reflected and the liquid crystal is used as an original sheet pressing plate. In the display copy mode, the bias, light intensity and charge are controlled to meet an optimum process condition. This method has been described above.

FIG. 15 shows a diagram which uses a photosensitive belt or web 138. DEV denotes a developer, PC3 denotes a primary charger, TC2 denotes a transfer charger, DC2 denotes a separation charger, numeral 139 denotes a potential charger, numeral 140 denotes a lens array and numeral 141 denotes a cassette.

As described above, in accordance with the present invention, a high contrast image is reproduced when the image is formed on the photoconductor by using the liquid crystal.

The problems encountered in the prior art apparatus when the liquid crystal display device and the copying machine were combined are resolved in the present invention.

The present invention is not limited to the illustrated embodiments but various modifications may be made within the scope of the appended claims.

What we claim is:

1. An image forming apparatus comprising:
   a light source;
   a photosensitive member adopted to be illuminated by a light from said light source;
   a liquid crystal having a liquid crystal display panel for displaying an image, and for controlling illumination and non-illumination of the light to said photosensitive member to form an image on said photosensitive member;
   detection means for detecting an image reproduction ability of said photosensitive member to set an image forming condition on said photosensitive member; and
   setting means for setting said liquid crystal display panel to a predetermined condition to allow detection by said detection means.

2. An image forming apparatus according to claim 1 further comprising light intensity control means for controlling a light intensity of said light source by an output of said detection means.

3. An image forming apparatus according to claim 1 further comprising charging means for uniformly charging said photosensitive member, and charge control means for controlling a charge output of said charging means by the output of said detection means.

4. An image forming apparatus according to claim 1 wherein said liquid crystal display panel is a transmission type liquid crystal display panel.

5. An image forming apparatus according to claim 1 wherein said liquid crystal display panel is a reflection type liquid crystal display panel.

6. An image forming apparatus according to claim 4 wherein said setting means sets said liquid crystal display panel to a light transmission mode.

7. An image forming apparatus according to claim 4 wherein said setting means sets said liquid crystal display panel to a light blocking mode.

8. An image forming apparatus according to claim 5 wherein said setting means sets said liquid crystal display panel to a light transmission mode.

9. An image forming apparatus according to claim 5 wherein said setting means sets said liquid crystal display panel to a light reflection mode.

10. An image forming apparatus according to claim 1 wherein said detection means is a surface potential sensor for detecting a surface potential of said photosensitive member.

11. An image forming apparatus comprising:
    a liquid crystal display having a liquid crystal display panel for displaying an image;
    a copier for copying the image formed on said liquid crystal display panel, including a photosensitive member, an optical system for focusing the image formed on said liquid crystal display panel onto said potosensitive member, and charging means for uniformly charging said photosensitive member,
    a surface potential sensor for detecting a surface potential of said photosensitive member; and
    setting means for setting said liquid crystal display panel to a predetermined condition to allow the detection by said surface potential sensor.

12. An image forming apparatus according to claim 11 wherein said liquid crystal display panel includes a transmission type liquid crystal and a light source.

13. An image forming apparatus according to claim 12 wherein a light intensity of said light source in a copy mode by said copier is higher than that in another mode.

14. An image forming apparatus according to claim 12 wherein said setting means sets said liquid crystal to a light transmission mode.

15. An image forming apparatus according to claim 12 wherein said setting means sets said liquid crystal to a light blocking mode.

16. An image forming apparatus according to claim 11 further comprising control means for controlling a charge output of said charging means by an output of said surface potential sensor.

17. An image forming apparatus according to claim 16 wherein said liquid crystal display panel is reset from said predetermined condition to an image display condition after the control by said control means.

18. An image forming apparatus according to claim 11 wherein said liquid crystal display panel is a reflection type liquid crystal.

19. An image forming apparatus according to claim 11 wherein said copier has an original sheet platen and can form a normal copy.

* * * * *

UNITED STATES PATENT AND TRADEMARK OFFICE
CERTIFICATE OF CORRECTION

PATENT NO.   :   4,571,053
DATED        :   February 18, 1986
INVENTOR(S)  :   NOBUHIRO KASAMA, ET AL.

It is certified that error appears in the above-identified patent and that said Letters Patent is hereby corrected as shown below:

COLUMN 2

Line 29,        "uninformly" should be --uniformly--.
    Lines 44-45,    "image apparatus," should be --image processing appratus,--.
    Line 53,        "light source" should be --light emitting source--.

COLUMN 7

Line 63,        "made" should be --mode--.

COLUMN 10

Line 21,        "potosensitive" should be --photosensitive--.
    Line 22,        "member," should be --member;--.

Signed and Sealed this

Third Day of February, 1987

Attest:

DONALD J. QUIGG

*Attesting Officer*       *Commissioner of Patents and Trademarks*